(12) United States Patent
Wang et al.

(10) Patent No.: US 8,812,008 B2
(45) Date of Patent: Aug. 19, 2014

(54) METHODS AND APPARATUS FOR ASSIGNING RESOURCES TO SCHEDULE PEER-TO-PEER COMMUNICATIONS IN WWAN

(75) Inventors: Hua Wang, Bridgewater, NJ (US); Shailesh Patil, Bridgewater, NJ (US); Xinzhou Wu, Monmouth Junction, NJ (US); Junyi Li, Chester, NJ (US); Sundar Subramanian, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 714 days.

(21) Appl. No.: 13/073,847

(22) Filed: Mar. 28, 2011

(65) Prior Publication Data

US 2012/0252510 A1 Oct. 4, 2012

(51) Int. Cl.
*H04W 72/00* (2009.01)
*H04W 72/08* (2009.01)
*H04W 24/10* (2009.01)

(52) U.S. Cl.
CPC ............ *H04W 72/085* (2013.01); *H04W 24/10* (2013.01)
USPC ........ 455/450; 455/451; 455/452.1; 455/453; 455/454; 455/455; 709/224; 709/225; 709/226; 709/227; 709/228

(58) Field of Classification Search
USPC ............................. 455/450–455, 522, 69–70; 709/227–244
See application file for complete search history.

(56) References Cited

U.S. PATENT DOCUMENTS

| | | | |
|---|---|---|---|
| 5,914,947 A | 6/1999 | Saito | |
| 8,134,931 B2 | 3/2012 | Laroia et al. | |
| 2005/0085235 A1 | 4/2005 | Park et al. | |
| 2006/0165035 A1 | 7/2006 | Chandra et al. | |
| 2007/0054626 A1* | 3/2007 | Li et al. ........................... | 455/69 |
| 2009/0010179 A1 | 1/2009 | Laroia et al. | |
| 2009/0016219 A1 | 1/2009 | Laroia et al. | |

(Continued)

FOREIGN PATENT DOCUMENTS

| | | |
|---|---|---|
| EP | 0752766 A1 | 1/1997 |
| EP | 0967769 A2 | 12/1999 |

(Continued)

OTHER PUBLICATIONS

International Search Report and Written Opinion—PCT/US2012/031029—ISA/EPO—Sep. 11, 2012.

*Primary Examiner* — Fayyaz Alam
(74) *Attorney, Agent, or Firm* — James K. O'Hare

(57) ABSTRACT

A method of operating a wireless device includes determining an energy on each of a plurality of resources for broadcasting CIDs, sending information to a base station based on the determined energy for each of the CIDs, and receiving a CID from the base station. The received CID is one of the CIDs determined based on the information. A method of wireless communication includes receiving first information about a first plurality of CIDs from a first wireless device, receiving second information about a second plurality of CIDs from a second wireless device, comparing the first information and the second information to determine a subset of CIDs based on the first plurality of CIDs and the second plurality of CIDs, selecting a CID based on the subset of CIDs, and sending the selected CID to at least one of the first wireless device or the second wireless device.

10 Claims, 15 Drawing Sheets

(56) References Cited

U.S. PATENT DOCUMENTS

| | | |
|---|---|---|
| 2009/0016285 A1 | 1/2009 | Li et al. |
| 2009/0019168 A1* | 1/2009 | Wu et al. ............... 709/228 |
| 2009/0232086 A1 | 9/2009 | Li et al. |
| 2009/0232142 A1 | 9/2009 | Li et al. |
| 2009/0232143 A1 | 9/2009 | Li et al. |
| 2010/0085973 A1* | 4/2010 | Li et al. ............... 370/395.3 |
| 2010/0189046 A1 | 7/2010 | Baker et al. |

FOREIGN PATENT DOCUMENTS

| | | |
|---|---|---|
| EP | 1204287 A1 | 5/2002 |
| EP | 1811689 A1 | 7/2007 |
| WO | 0141491 A2 | 6/2001 |

* cited by examiner

METHODS AND APPARATUS FOR ASSIGNING RESOURCES TO SCHEDULE PEER-TO-PEER COMMUNICATIONS IN WWAN

BACKGROUND

1. Field

The present disclosure relates generally to communication systems, and more particularly, to assigning resources to schedule peer-to-peer communications in wireless wide area network (WWAN) communication.

2. Background

In WWAN, all communications between wireless devices go through uplink/downlink channels between wireless devices and base stations. When two communicating wireless devices are in the vicinity of each other, to reduce a load on the base station, the two wireless devices may use direct peer-to-peer communication instead of the uplink/downlink channels through the base station. When there are multiple peer-to-peer communications (i.e., multiple links) in proximity of one another, link scheduling becomes necessary to control cross link interference. Link scheduling may be performed through a set of dedicated orthogonal time-frequency resources in addition to the peer-to-peer data communication resources. The dedicated connection scheduling resources allow links to exchange information in a distributed manner in order to determine which set of links may transmit in the peer-to-peer data communication resources.

To avoid collisions in the connection scheduling resources, links in the vicinity of each other may be assigned different resources. The allocation of different resources allow links to transmit on their assigned connection scheduling resources and receive on all remaining connection scheduling resources in order to determine the cross link interference and to determine which links may transmit in the peer-to-peer data communication resources based on the cross link interference. How links are allocated different resources is therefore important. There is a current need in the art for improving the process for assigning different resources to various links.

SUMMARY

In an aspect of the disclosure, a method, an apparatus, and a computer program product are provided in which an energy on each of a plurality of resources is determined for broadcasting connection identifiers. Information is sent to a base station based on the determined energy for each of the connection identifiers. A connection identifier is received from the base station. The connection identifier is one of the connection identifiers determined based on the information.

In an aspect of the disclosure, a method, an apparatus, and a computer program product for wireless communication are provided in which first information about a first plurality of connection identifiers is received from a first wireless device. Second information about a second plurality of connection identifiers is received from a second wireless device. The first information and the second information are compared to determine a subset of connection identifiers based on the first plurality of connection identifiers and the second plurality of connection identifiers. A connection identifier is selected based on the subset of connection identifiers. The selected connection identifier is sent to at least one of the first wireless device or the second wireless device.

DETAILED DESCRIPTION

Figure 1:
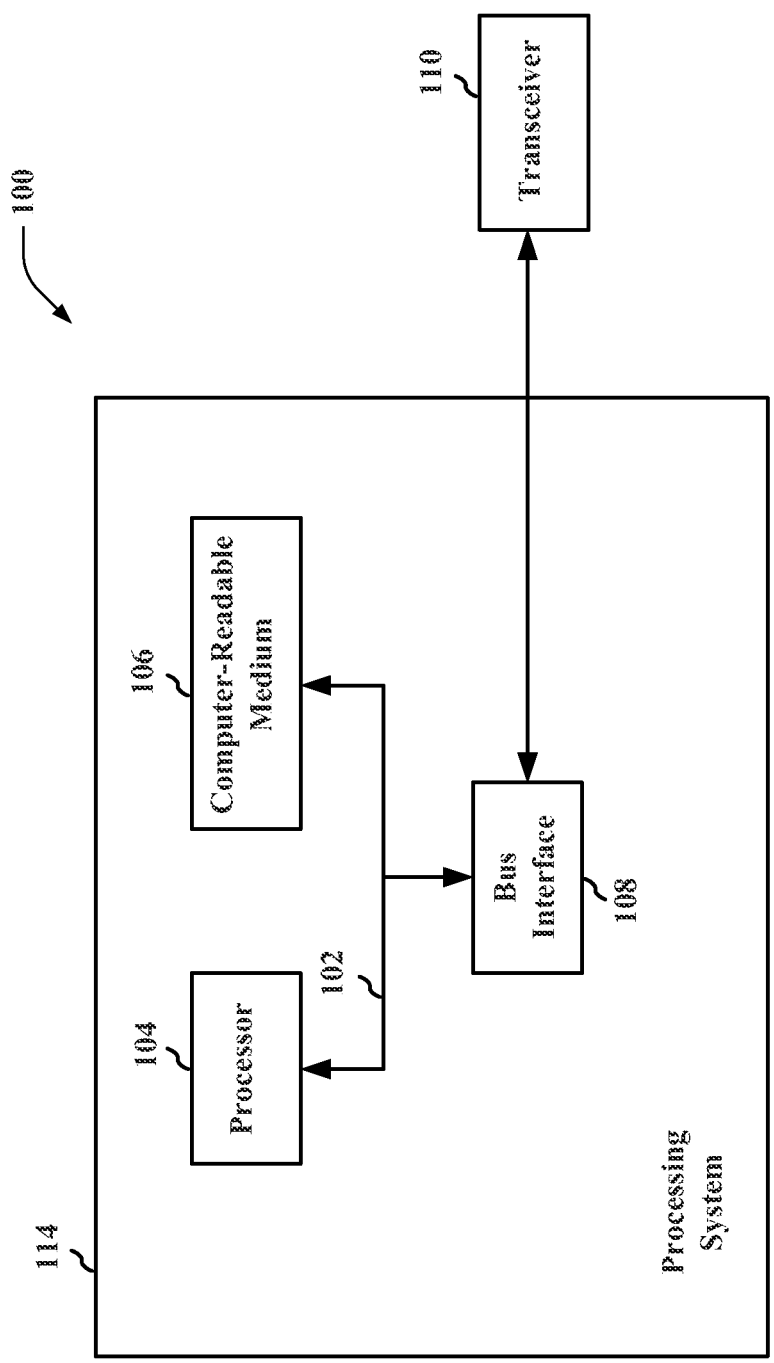
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
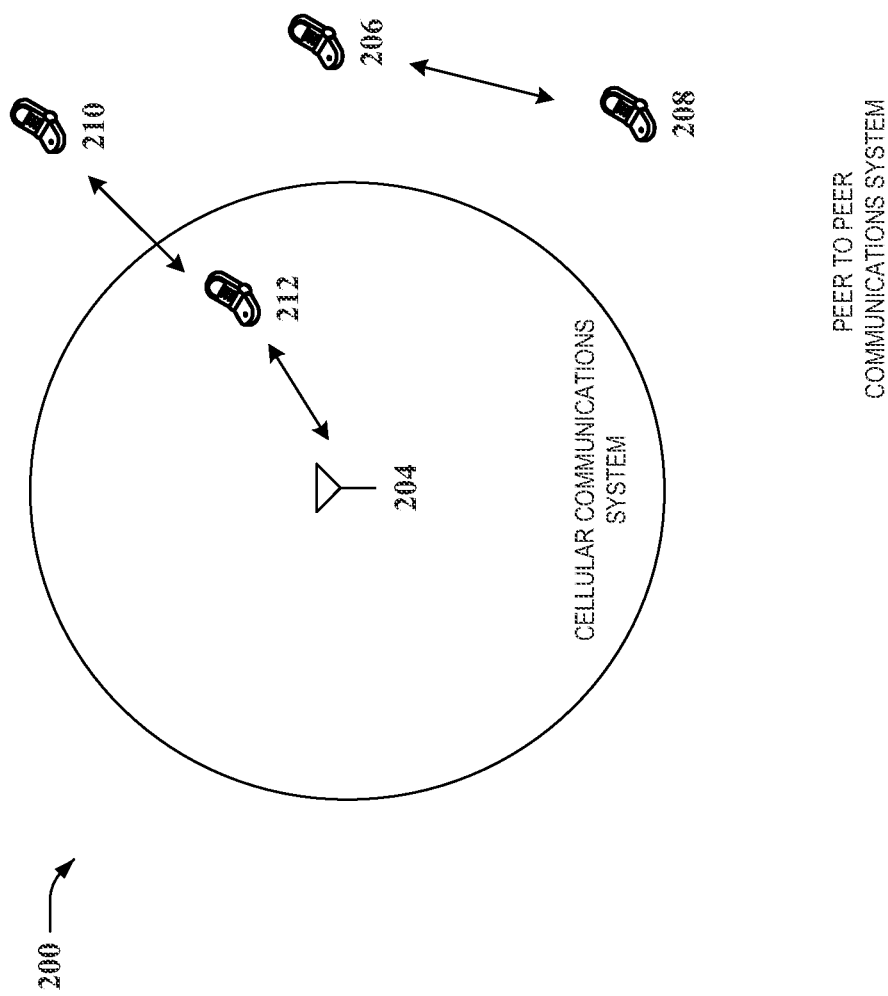
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
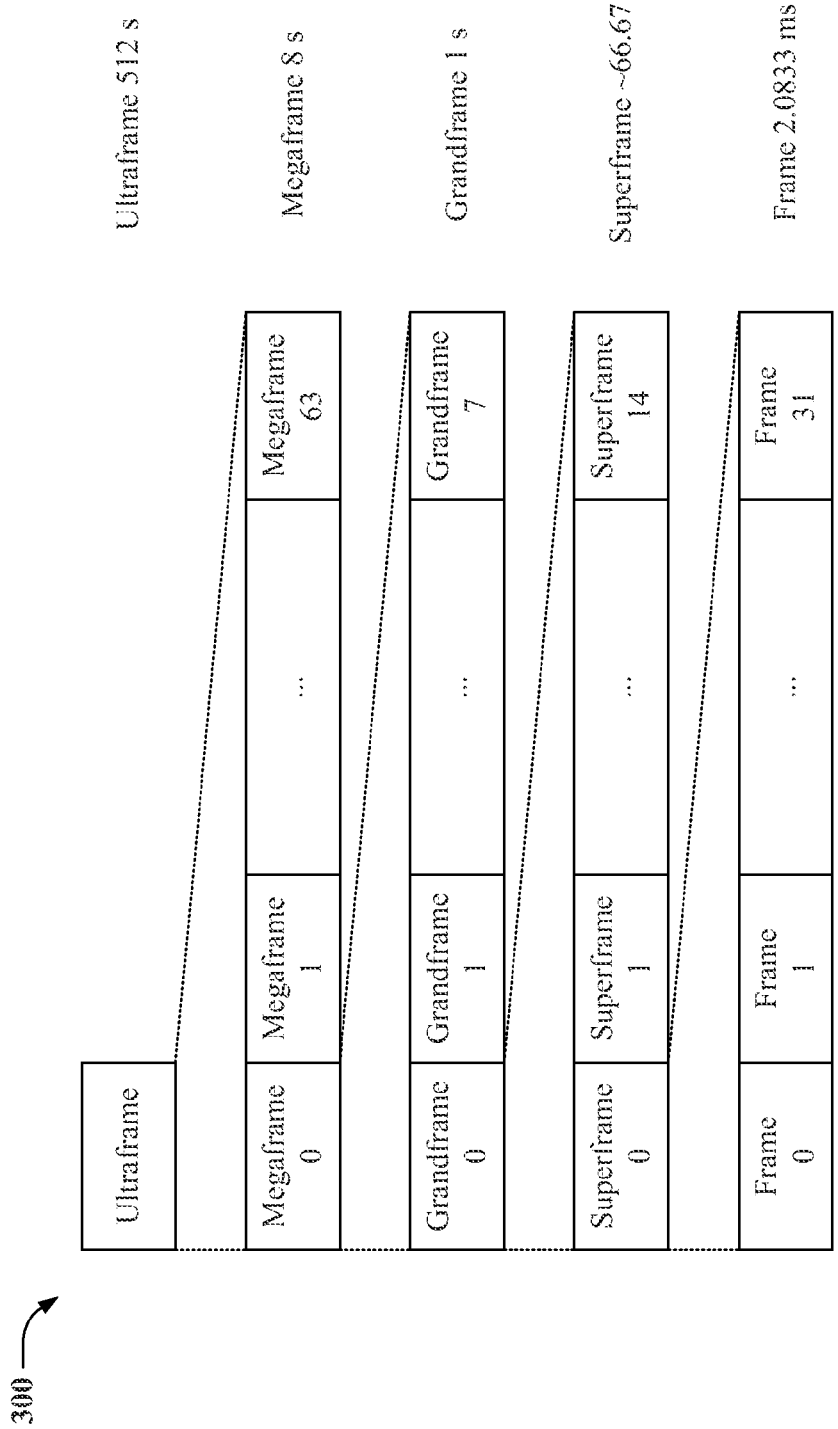
FIG. 3 is a diagram illustrating a time structure for peer-to-peer communication between the wireless devices.

FIG. 3 is a diagram 300 illustrating a time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
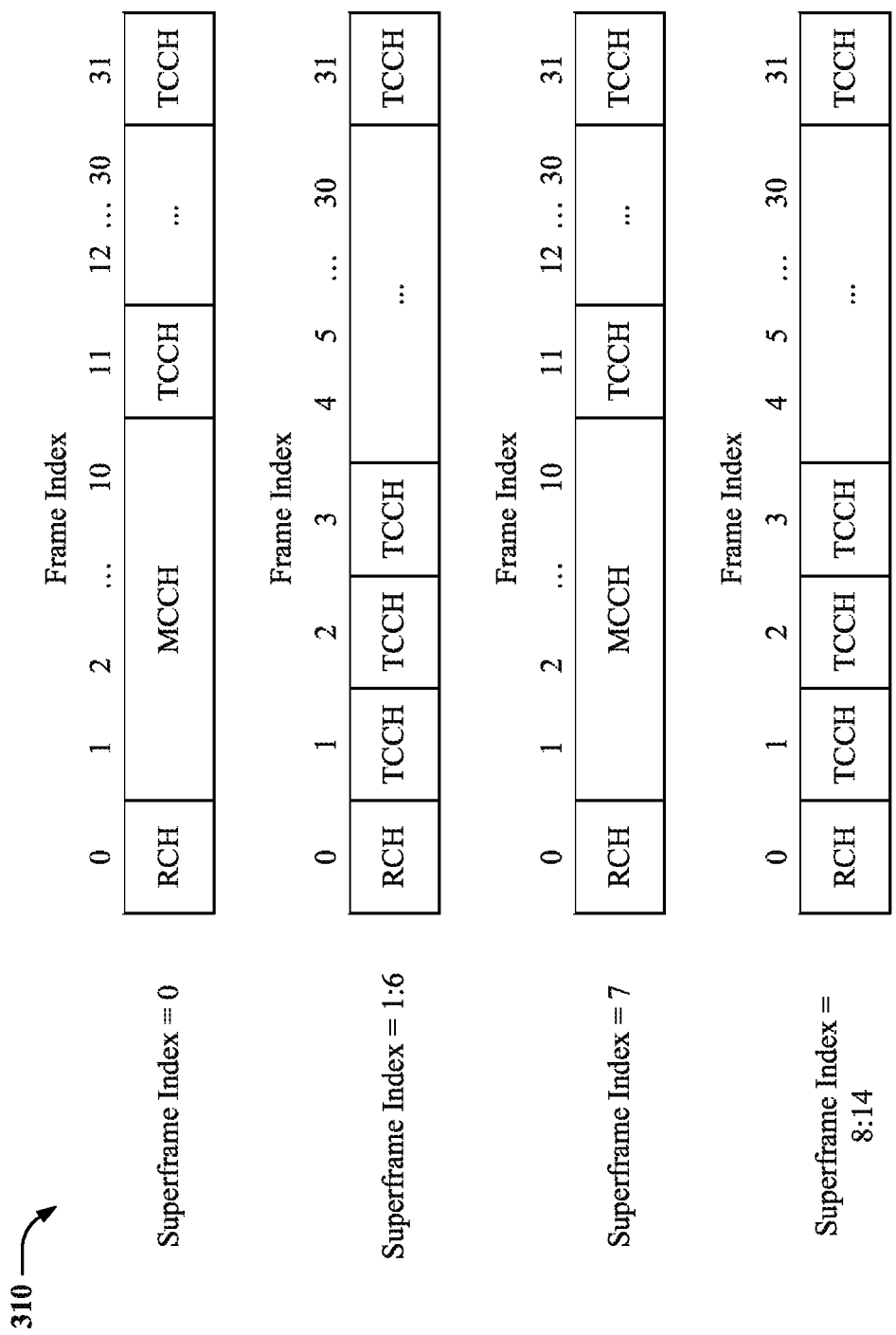
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
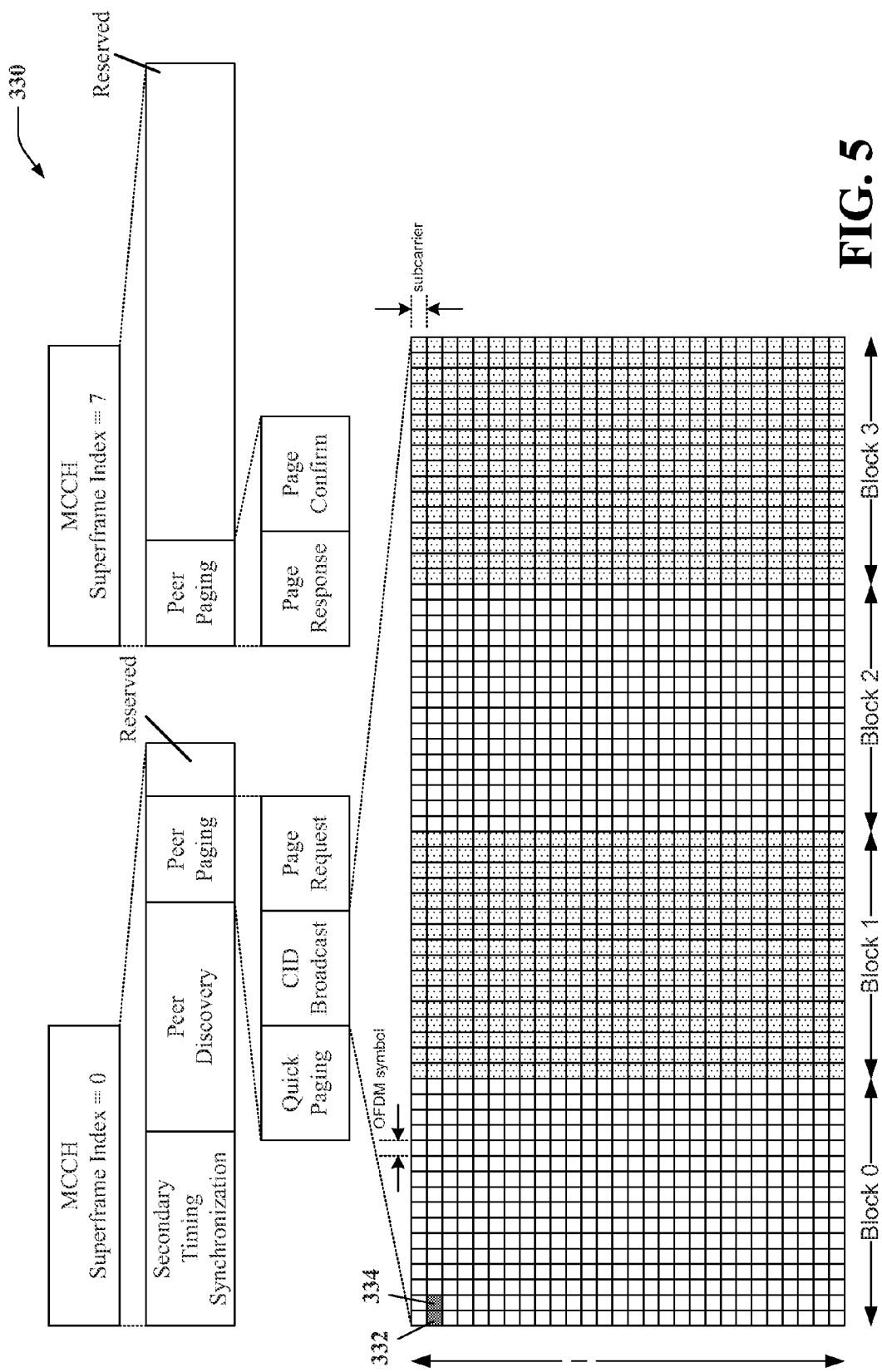
FIG. 5 is a diagram illustrating an operation timeline of a miscellaneous channel and a structure of a connection identifier broadcast.

FIG. 5 is a diagram 330 illustrating an operation timeline of the MCCH and a structure of a connection identifier (CID) broadcast. As discussed in relation to FIG. 4, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides a wireless device evidence that its link connection with a communication peer still exists.

The structure of the CID broadcast consists of four blocks, each of which contains a plurality of resource elements, i.e., a plurality of subcarriers in the frequency domain and OFDM symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. If an additional resource element is allocated for each CID, the wireless devices may also transmit a device identifier so that other wireless devices may determine which wireless device is using a particular CID. For a given CID, each pair of resource elements has a fixed OFDM symbol position and a varying subcarrier within the block that varies each grandframe. In any given link, the wireless device that initiated the link randomly selects a block from Block 0 and Block 2 for the CID broadcast and the other wireless device in the link randomly selects a block from Block 1 and Block 3 for the CID broadcast. As such, for a particular CID, only half of the allocated resources are utilized by a link with that CID. Due to the random selection of a block, a first wireless device in a link with a second wireless device will be able to detect a CID collision when a third wireless device or a fourth wireless device in a different link transmits a CID broadcast using a block different than the block selected by the first wireless device or the second wireless device.

For example, assume a wireless device with a CID=4 selects Block 0 for the CID broadcast. The wireless device may be allocated resource elements 332, 334 for the CID broadcast. In resource element 332, the wireless device transmits an energy proportional to a power used to transmit in the TCCH. In resource element 334, the wireless device transmits an energy inversely proportional to a power received in the TCCH. In a subsequent grandframe, the wireless device may have a different pair of resource elements with a different subcarrier, but the same relative OFDM symbol position (i.e., in this example, the first and the second OFDM symbol of the selected block).

Figure 6:
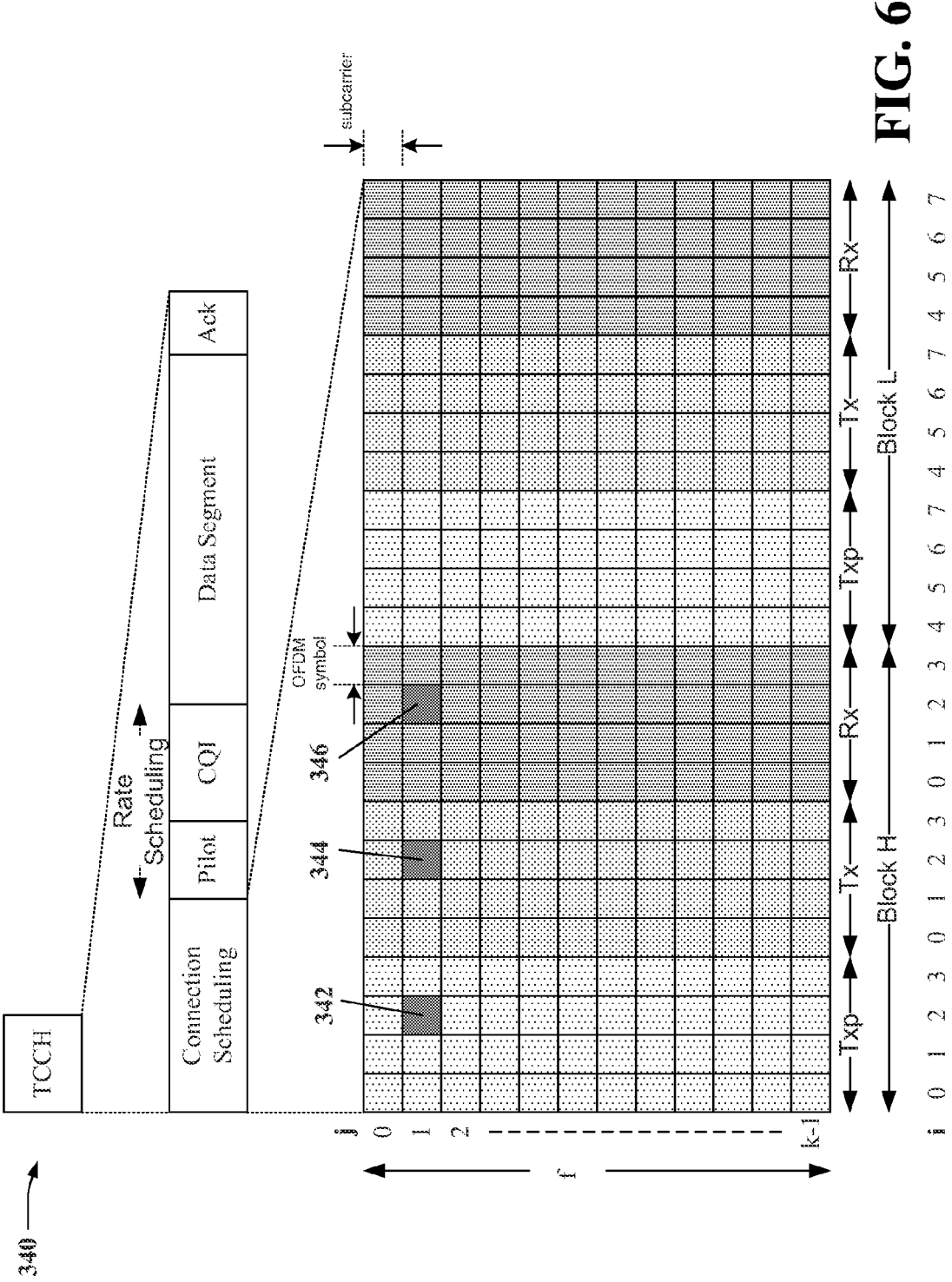
FIG. 6 is a diagram illustrating an operation timeline of a traffic channel slot and a structure of connection scheduling.

FIG. 6 is a diagram 340 illustrating an operation timeline of a TCCH slot and a structure of connection scheduling. As shown in FIG. 6, a TCCH slot includes four subchannels: connection scheduling, rate scheduling, data segment, and ACK. The rate scheduling subchannel includes a pilot segment and a CQI segment. The ACK subchannel is for transmitting an ACK or negative ACK (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a CID. Based on the CID, for a particular TCCH slot, wireless devices in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 342 in the Txp-block of Block H, the resource element 344 in the Tx-block of Block H, and the resource element 346 in the Rx-block of Block H for transmitting/receiving a scheduling control signal. A transmit request signal in the Tx-block is transmitted with a power equal to a power for transmitting the data segment. A transmit request response signal in the Rx-block is transmitted with a power proportional to an inverse of the power of the received transmit request signal. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 342, 344, 346 corresponds to i=2 and j=1. The medium access priority is equal to ki+j+1, where i is the respective OFDM symbol in each of the Txp, Tx, and Rx subblocks, j is the subcarrier, and k is the number of subcarriers. Accordingly, assuming k=28, the resource elements 342, 344, 346 correspond to a medium access priority of 58.

Figure 7:
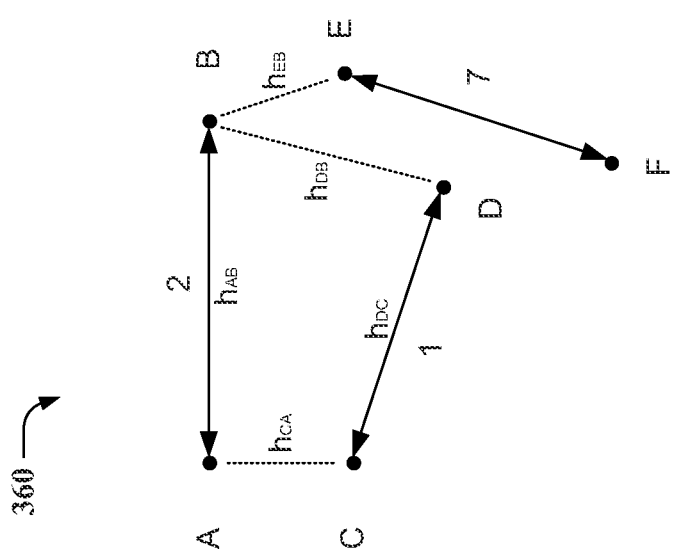
FIG. 7 is a first diagram for illustrating a connection scheduling signaling scheme for the wireless devices.

FIG. 7 is a first diagram 360 for illustrating an exemplary connection scheduling signaling scheme for the wireless devices 100. As shown in FIG. 7, wireless device A is communicating with wireless device B, wireless device C is communicating with wireless device D, and wireless device E is communicating with wireless device F. The wireless device A is assumed to have transmit priority over the wireless device B, the wireless device C is assumed to have transmit priority over the wireless device D, and the wireless device E is assumed to have transmit priority over the wireless device F. Each of the links has a different medium access priority depending on the particular slot for communication. For the particular slot for communication, link 1 (A, B) is assumed to have a medium access priority of 2, link 2 (C, D) is assumed to have a medium access priority of 1, and link 3 (E, F) is assumed to have a medium access priority of 7.

Figure 8:
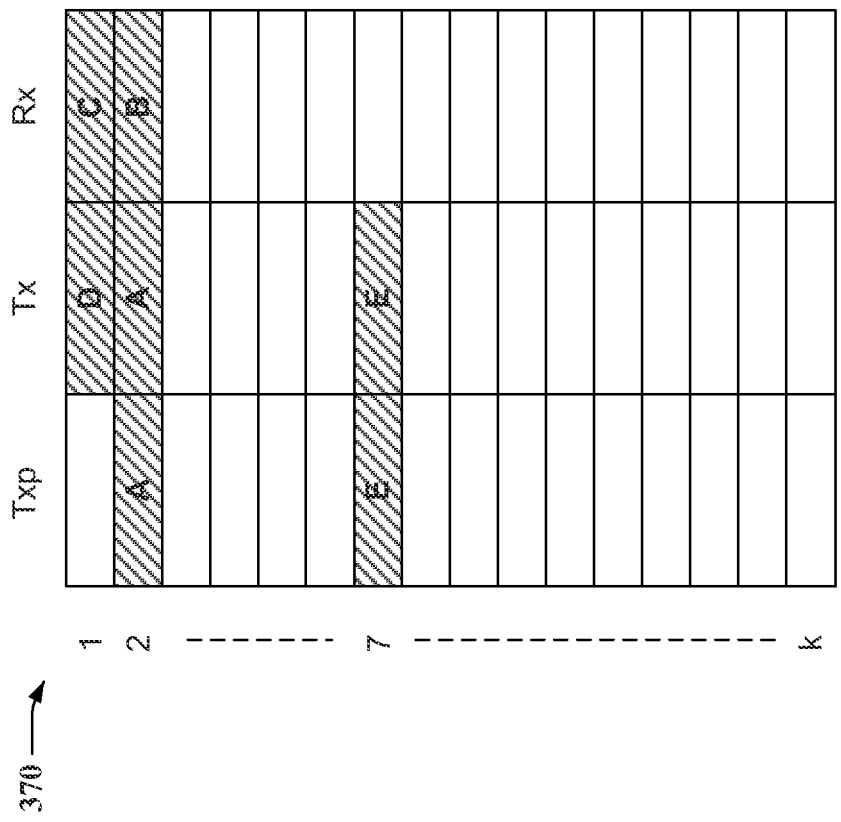
FIG. 8 is a second diagram for illustrating a connection scheduling signaling scheme for the wireless devices.

FIG. 8 is a second diagram 370 for illustrating an exemplary connection scheduling signaling scheme for the wireless devices 100. FIG. 8 shows connection scheduling resources of first respective OFDM symbols (i=0, see FIG. 6) of Txp, Tx, and Rx subblocks in Block H (corresponding to medium access priorities 1 through k) in the connection scheduling subchannel. The connection scheduling resources include a plurality of subcarriers, each of the subcarriers corresponding to one of k frequency bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., a power for transmitting the data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison.

For example, assume the nodes A, D, and E transmit a transmit request signal in the Tx-block at a power equal to $P_A$, $P_D$, and $P_E$, respectively. The node B receives the transmit request signal from the node A at a power equal to $P_A|h_{AB}|^2$, where $h_{AB}$ is the pathloss between the node A and the node B. The node B receives the transmit request signal from the node D with a power equal to $P_D|h_{DB}|^2$, where $h_{DB}$ is the pathloss between the node D and the node B. The node B receives the transmit request signal from the node E with a power equal to $P_E|h_{EB}|^2$, where $h_{EB}$ is the pathloss between the node E and the node B. The node B compares the power of the received transmit request signal from the node A divided by the sum of the powers of the received transmit request signals from other nodes with a higher priority to a threshold in order to determine whether to Rx-yield. The node B does not Rx-yield if the node B expects a reasonable signal to interference ratio (SIR) if scheduled. That is, the node B Rx-yields unless $P_A|h_{AB}|^2/P_D|h_{DB}|^2 > \gamma_{RX}$, where $\gamma_{RX}$ is the threshold (e.g., 9 dB).

The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link. All of the transmitters listen to the tones in the Rx-block to determine whether to Tx-yield transmission of the data segment.

For example, the node C, having received the transmit request signal from the node D at a power equal to $P_D|h_{DC}|^2$, transmits a transmit request response signal in the Rx-block at a power equal to $K/P_D|h_{DC}|^2$, where $h_{DC}$ is the pathloss between the node D and the node C, and K is a constant known to all nodes. The node A receives the transmit request response signal from the node C at a power equal to $K|h_{CA}|^2/P_D|h_{DC}|^2$, where $h_{CA}$ is the pathloss between the node C and the node A. The node A Tx-yields if the node A would cause too much interference to the node C. That is, the node A Tx-yields unless $P_D|h_{DC}|^2/P_A|h_{CA}|^2 > \gamma_{TX}$, where $\gamma_{TX}$ is a threshold (e.g., 9 dB).

The connection scheduling signaling scheme is best described in conjunction with an example. The node C has no data to transmit and does not transmit in the Txp-block for medium access priority 1, the node A has data to transmit and transmits in the Txp-block for medium access priority 2, and the node E has data to transmit and transmits in the Txp-block for medium access priority 7. The node D has data to transmit and transmits in the Tx-block for medium access priority 1, the node A transmits in the Tx-block for medium access priority 2, and the node E transmits in the Tx-block for medium access priority 7. The node C listens to the tones in the Tx-blocks and determines to transmit in the Rx-block for medium access priority 1, as the node C has the highest priority. The node B listens to the tones in the Tx-blocks, determines that its link would not interfere with link 2, which has a higher medium access priority, and transmits in the Rx-block for medium access priority 2. The node F listens to the tones in the Tx-blocks, determines that its link would interfere with link 1 and/or link 2, both of which have a higher medium access priority, and Rx-yields by not transmitting in the Rx-block for medium access priority 7. Subsequently, both D and A listen to the tones in the Rx blocks to determine whether to transmit the data. Because D has a higher link medium access priority than A, D transmits its data. A will Tx-yield transmission of the data if A determines that its transmission would interfere with the transmission from D.

Figure 9:
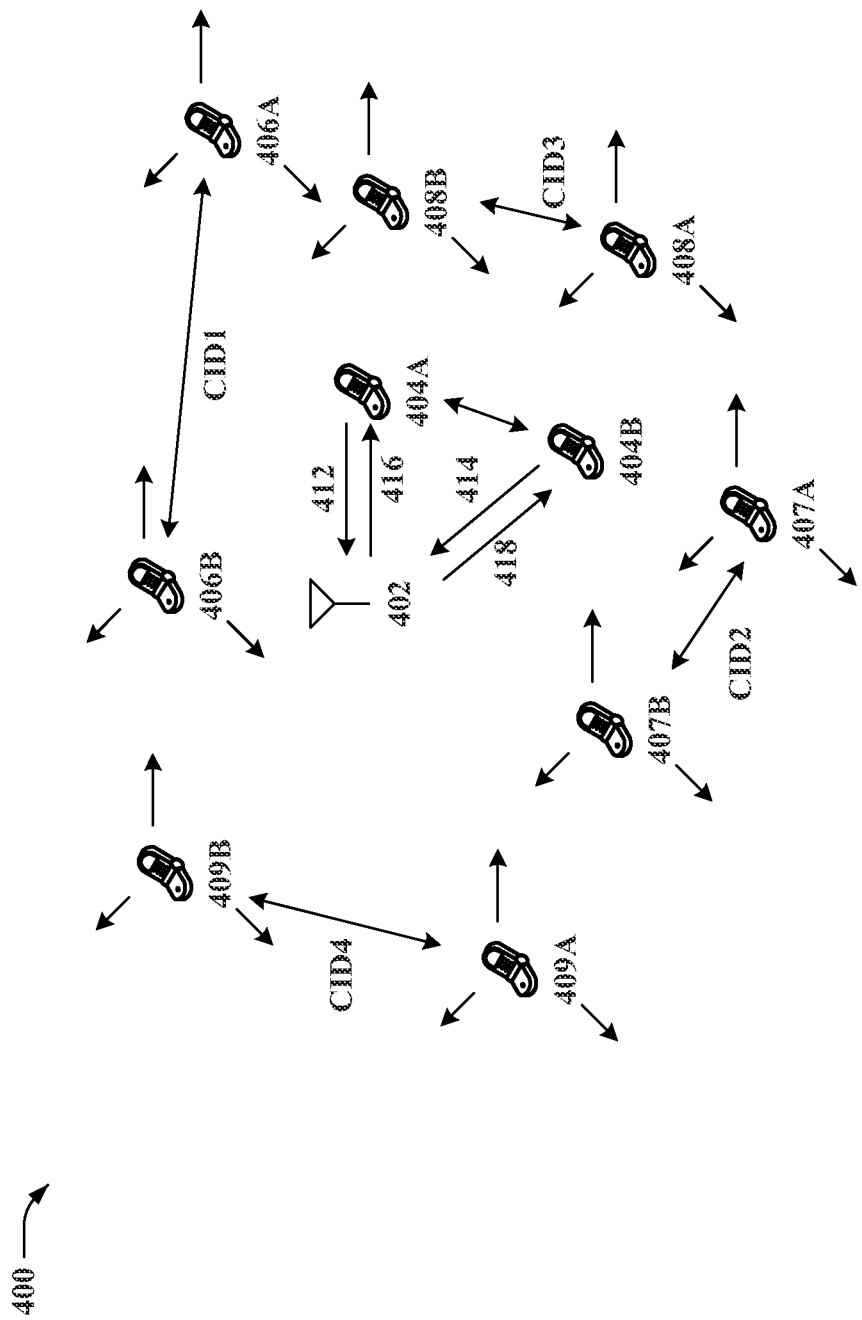
FIG. 9 is a diagram for illustrating exemplary methods.

FIG. 9 is a diagram 400 for illustrating exemplary methods. As discussed supra, the proper selection of a CID allows a link to avoid CID collisions and to participate in connection scheduling (see FIG. 6 and related discussion) in a distributed manner in order to determine a cross link interference with other communicating links and to determine whether to transmit in the data segment channel based on the determined cross link interference (see FIGS. 7, 8 and related discussion). As such, the selection of the CID is important. According to the exemplary methods, the base station 402 selects a CID for a link based on information gathered by wireless devices participating in the link and may also select the CID for a link based on information gathered by wireless devices not participating in the link (e.g., wireless devices participating in other links). As shown in FIG. 9, the wireless device 404A and the wireless device 404B would like to establish a link together, the wireless devices 406A, 406B are in peer-to-peer communication with CID1, the wireless devices 407A, 407B are in peer-to-peer communication with CID2, the wireless devices 408A, 408B are in peer-to-peer communication with CID3, and the wireless devices 409A, 409B are in peer-to-peer communication with CID4. In a plurality of resources for broadcasting CIDs (e.g., the CID broadcast channel resources of FIG. 5), the wireless devices 406A, 406B are broadcasting signals in resources allotted for CID1, the wireless devices 407A, 407B are broadcasting signals in resources allotted for CID2, the wireless devices 408A, 408B are broadcasting signals in resources allotted for CID3, and the wireless devices 409A, 409B are broadcasting signals in resources allotted for CID4.

According to an exemplary method, the wireless devices 404A, 404B each determine an energy on each of a plurality of resources for broadcasting CIDs. For example, the wireless devices 404A, 404B may determine an energy on each of the resources allotted to CID1, CID2, CID3, and CID4. The wireless device 404A may determine than the energy on resources allotted to CID 1 and CID3 is above a threshold and that the energy on resources allotted to CID2 and CID4 is below a threshold. The wireless device 404B may determine that the energy on resources allotted to CID2 and CID3 is above a threshold and that the energy on resources allotted to CID1 and CID4 is below a threshold. The wireless devices 404A, 404B may also rank the CIDs or a subset of the CIDs based on the determined energies. For example, the wireless device 404A may rank the CIDs in the order CID1, CID3, CID2, CID4 and the wireless device 404B may rank the CIDs in the order CID2, CID3, CID1, CID4.

After determining an energy on each of the plurality of resources for broadcasting CIDs, the wireless devices 404A, 404B send information 412, 414, respectively, to the base station 402 based on the determined energy for each of the CIDs. The information may contain information on all the CIDs or some of the CIDs. When the information contains information on only some of the CIDs, the information may contain CID information for non-interfering links with an energy below a threshold or CID information for interfering links with an energy above a threshold. For example, the wireless device 404A may send the information 412 containing the list CID1, CID3 in decreasing determined energy and the wireless device 404B may send the information 414 containing the list CID2, CID3 in decreasing determined energy.

When the CID broadcast includes device identifiers and the information includes CID information for interfering links, the wireless devices 404A, 404B may also send information on which wireless devices are using the reported CIDs. For example, the wireless device 404A may determine that wireless devices 406A, 406B are utilizing CID1 and that the wireless device 409B is utilizing CID3, and the wireless device 404B may determine that the wireless devices 407A, 407B are utilizing CID2 and that the wireless device 409A is utilizing CID3. In such a configuration, the wireless device 404A may send the information 412 containing the list CID1, CID3 along with the device identifiers of the wireless devices 406A, 406B, and 409B, and the wireless device 404B may send the information 414 containing the list CID2, CID3 along with the device identifiers of the wireless devices 407A, 407B, and 409A.

After the information 412, 414 is sent, at least one of the wireless devices 404A, 404B receives a CID 416, 418, respectively, from the base station 402. The CID is one of CID1, CID2, CID3, and CID4 determined based on the information 412, 414. For example, the base station 402 may compare the information 412 including the CIDs CID1 and CID3 and the information 414 including the CIDs CID2 and CID3 to determine a common subset of CIDs CID1, CID2, and CID3. The base station 402 may then determine the subset of CIDs excluded from the common set, such as the subset of CIDs including CID4. From that subset of CIDs, the base station 402 may select CID4 for the wireless devices 404A, 404B, and send the CID4 416, 418 to at least one of the wireless devices 404A, 404B, respectively. The base station 402 may send the CID4 to only one of the wireless devices 404A, 404B, relying on the receiving wireless device to communicate the received CID to its peer.

As discussed supra, rather than send CID information for interfering links, the wireless devices may send CID information for non-interfering links. In such a configuration, the base station 402 would select a CID from the common subset of CIDs determined based on the comparison of the received CIDs.

The wireless devices may send additional information to the base station 402 to enable the base station 402 to make a more informed decision when selecting the CID. In one configuration, the wireless devices determine a signal to inference ratio (SIR) associated with each of the CIDs and send the information to the base station 402. The SIR is the transmit energy for an assigned CID divided by the determined energy for each of the CIDs. With this information, the base station 402 will know the extent of protection links have from non-interfering links. Some non-interfering links will be closer to the threshold of being interfering than other links. The information can be used by the base station 402 to provide a more efficient reuse of CID resources (e.g., by reusing the CIDs with non-interfering links that are closest to the threshold of interference), or to provide the best protection from existing links (e.g., by choosing the CIDs that provide the highest CIR protection).

In another configuration, the wireless devices determine a number of active links in their vicinity and send the information to the base station 402. The base station 402 can use this local topology information to determine whether tighter packing of CIDs is required due to the CID resource being constrained or whether the CID distribution may be spread out to provide maximum protection for existing links due to the CID resource being large.

In another configuration, the wireless devices determine a channel strength between themselves and their peer and send the information to the base station 402. The channel strength is associated with a link length, i.e., a distance between two wireless devices in peer-to-peer communication. The base station 402 may group the links into different CID groups based on the reported link length. To group the links into different CID groups, the base station 402 associates each of the CID groups with a different channel strength range of values and selects a CID for a link from a CID group if the reported channel strength is within the channel strength range of values for the CID group. Grouping the links into different CID groups can be especially useful if the links are scheduled based on their CIDs, such as in FlashLinQ where links obtain a medium access priority that is a function of the current time and their CID.

Alternatively, the base station 402 may group the links into different CID groups based on local topology information determined based on the number of active links reported by each of the wireless devices. By grouping the links into different CID groups based on local topology information, the base station 402 may be able to reduce or to eliminate the so called "cascade yielding problem." The cascade yielding problem is described with respect to FIG. 10.

Figure 10:
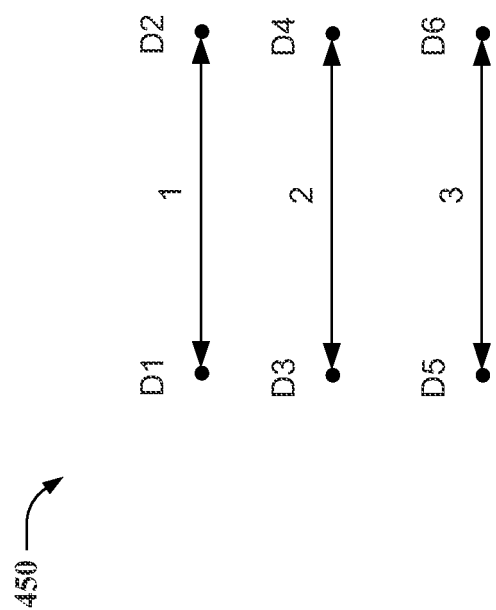
FIG. 10 is a diagram for illustrating the cascade yielding problem.

FIG. 10 is a diagram for illustrating the cascade yielding problem. As shown in FIG. 10, wireless device D1 is communicating with wireless device D2 in a first link, wireless device D3 is communicating with wireless device D4 in a second link, and wireless device D5 is communicating with wireless device D6 in a third link. The first link has a medium access priority of 1, the second link has a medium access priority of 2, and the third link has a medium access priority of 3. In the cascade yielding problem, if the second link determines that it would interfere with the first link, the second link Rx-yields to the first link that has a higher medium access priority. In addition, if the third link determines it would interfere with the second link, the third link Rx-yields to the second link that has a higher medium access priority. With both the second and third links yielding, only the first link communicates in that particular traffic slot. However, assuming the third link would not interfere with the first link, both the first link and the third link could have communicated in the traffic slot without interference. As such, in the cascade yielding problem, Rx-yielding cascades among successively lower priority links and results in a link yielding to a link that itself is yielding.

By knowing the local topology of the wireless devices, the base station 402 can help to reduce the cascade yielding problem by assigning the first, second, and third links to different CID groups based on a preferred medium access priority. For example, assume the CID groups include a high priority CID group, a medium priority CID group, and a low priority CID group. The base station 402 can assign the first link to the high priority CID group, the third link to the medium priority CID group, and the second link to the low priority link group. Through the CID group assignment, the third link will not Rx-yield to the first link and the second link will Rx-yield to the third link, thus the cascade yielding problem can be avoided and both the first link and the third link may communicate concurrently in the particular traffic slot.

Figure 11:
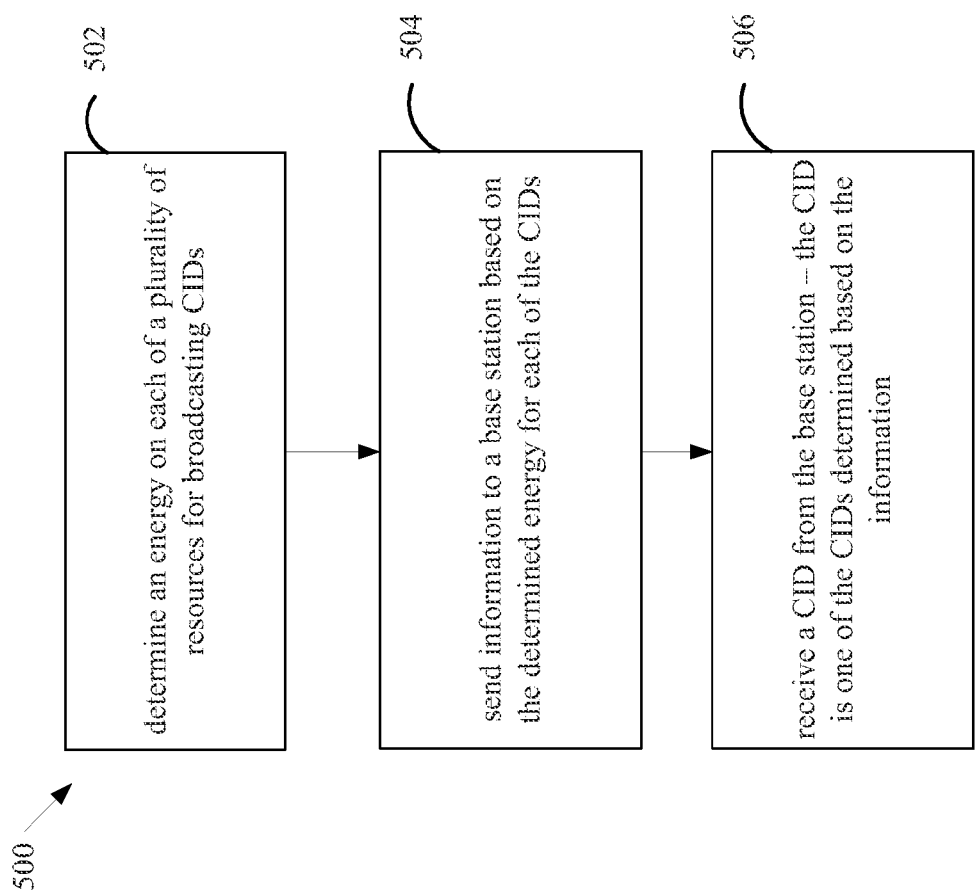
FIG. 11 is a flow chart of a first method of a wireless device.

FIG. 11 is a flow chart 500 of a first method of a wireless device, such as wireless device 404A. As shown in FIG. 11, the wireless device 404A determines an energy on each of a plurality of resources for broadcasting CIDs (502). In addition, the wireless device 404A sends information to a base station 402 based on the determined energy for each of the CIDs (504). Furthermore, the wireless device 404A receives a CID from the base station 402 (506). The CID is one of the CIDs determined based on the information (506).

Figure 12:
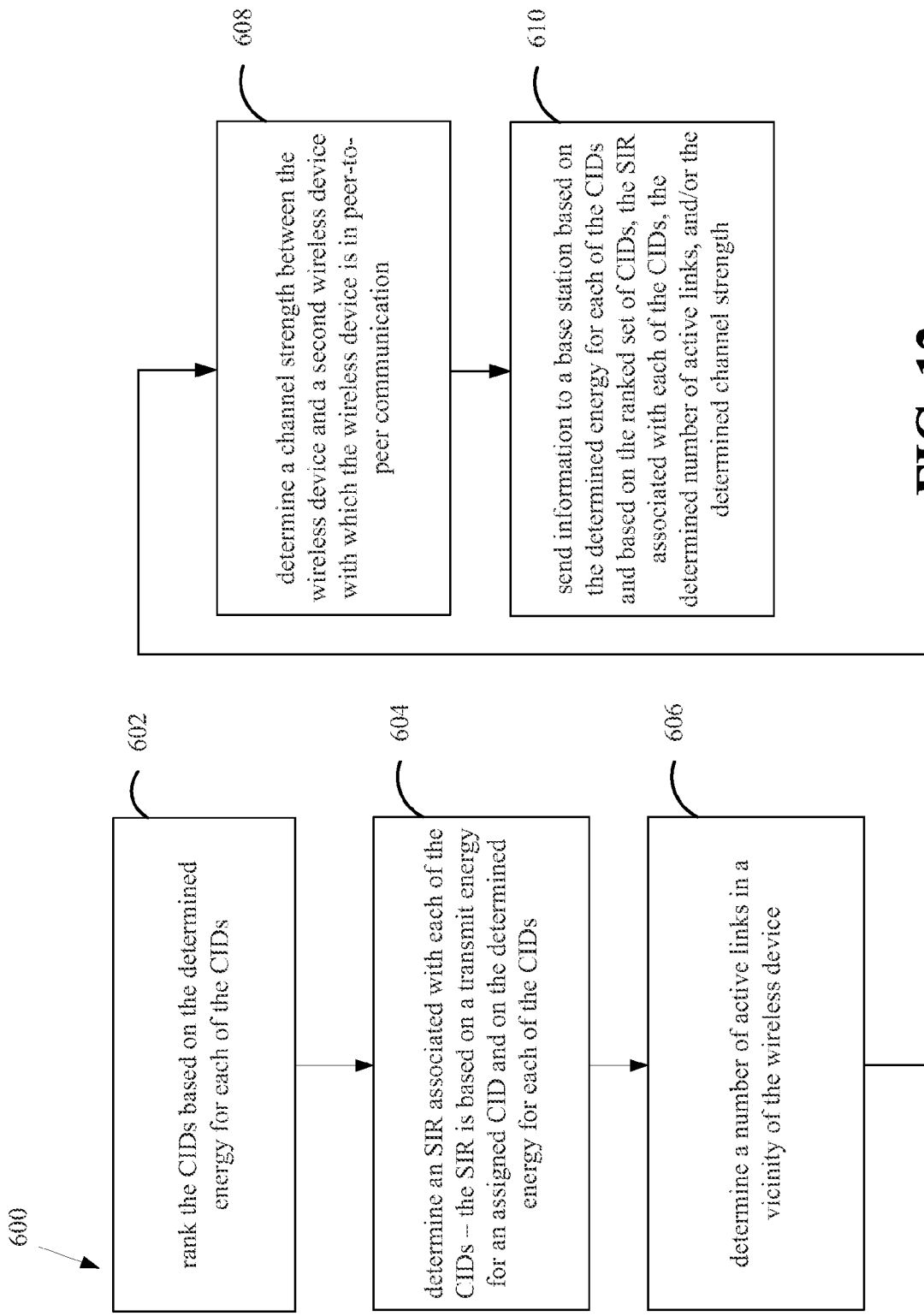
FIG. 12 is a flow chart of a second method of a wireless device.

FIG. 12 is a flow chart 600 of a second method of a wireless device, such as wireless device 404A. As shown in FIG. 12, the wireless device 404A may rank a subset of the CIDs based on the determined energy for each of the CIDs (602). In such a configuration, the information sent to the base station 402 by the wireless device 404A is further based on the ranked subset of CIDs (610). The wireless device 404A may determine an SIR associated with each of the CIDs (604). The SIR is based on a transmit energy for an assigned CID and on the determined energy for each of the CIDs (604). In such a configuration, the information sent to the base station 402 by the wireless device 404A is further based on the SIR associated with each of the CIDs (610). The wireless device 404A may determine a number of active links in a vicinity of the wireless device 404A (606). In such a configuration, the information sent to the base station 402 by the wireless device 402 is further based on the determined number of active links (610). The wireless device 404A may determine a channel strength between the wireless device 404A and a second wireless device 404B with which the wireless device 404A is in peer-to-peer communication (608). In such a configuration, the information sent to the base station 402 by the wireless device 404A is further based on the determined channel strength (610). The wireless device 404A sends the gathered information to the base station 402 (610). The information is based on a determined energy for each of the CIDs and one or more of ranked CIDs, SIR information, a number of active links, and a channel strength (610).

Figure 13:
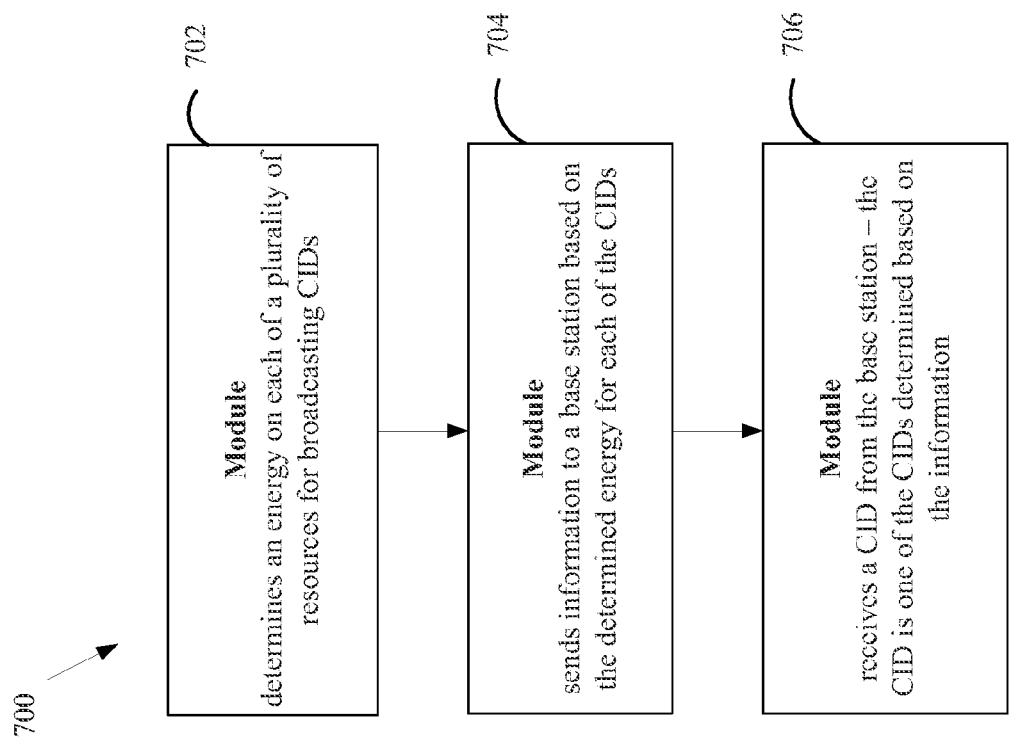
FIG. 13 is a conceptual block diagram illustrating the functionality of a first exemplary apparatus.

FIG. 13 is a conceptual block diagram 700 illustrating the functionality of a first exemplary apparatus 100. The apparatus 100 may be a wireless device, such as the wireless device 404A. The apparatus includes a module 702 that determines an energy on each of a plurality of resources for broadcasting CIDs. In addition, the apparatus 100 includes a module 704 that sends information to a base station based on the determined energy for each of the CIDs. Furthermore, the apparatus 100 includes a module 706 that receives a CID from the base station. The CID is one of the CIDs determined based on the information. The apparatus 100 may include additional modules that perform each of the steps in the aforementioned flow charts of FIG. 11 and FIG. 12. As such, each step in the aforementioned flow charts may be performed by a module and the apparatus 100 may include one or more of those modules.

Figure 14:
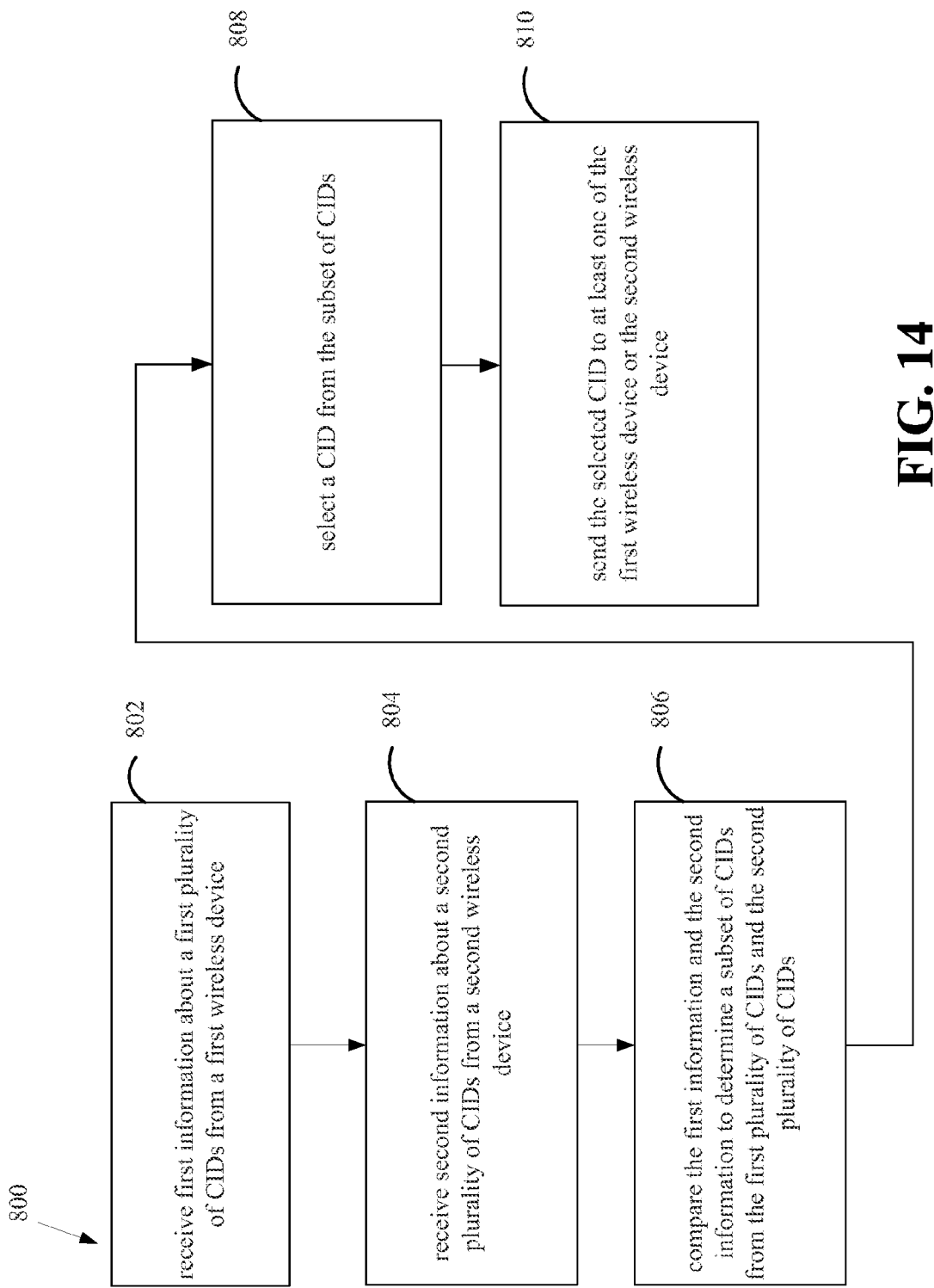
FIG. 14 is a flow chart of a first method of a base station.

FIG. 14 is a flow chart 800 of a first method of a base station, such as the base station 402. As shown in FIG. 14, the base station 402 receives first information about a first plurality of CIDs from a first wireless device (802). The base station 402 receives second information about a second plurality of CIDs from a second wireless device (804). The base station 402 compares the first information and the second information to determine a subset of CIDs based on the first plurality of CIDs and the second plurality of CIDs (806). The base station 402 selects a CID based on the subset of CIDs (808). The base station 402 sends the selected CID to at least one of the first wireless device or the second wireless device (810).

In one configuration, the first information includes the first plurality of CIDs ranked based on a determined energy on each of a plurality of resources for broadcasting the first plurality of CIDs, and the second information includes the second plurality of CIDs ranked based on a determined energy on each of a plurality of resources for broadcasting the second plurality of CIDs. For example, the base station 402 may receive the first information 412 that includes a CID list CID1, CID3 that is ranked in order of decreasing energy on each of the resources for broadcasting the CIDs. In addition, the base station 402 may receive the second information 414 that includes a CID list CID2, CID3 that is ranked in order of decreasing energy on each of the resources for broadcasting the CIDs.

In one configuration, the base station 402 compares the first information 412 and the second information 414 by comparing the ranked first plurality of CIDs CID1, CID3 and the ranked second plurality of CIDs CID2, CID3 to determine a ranked common subset of CIDs CID1, CID2, CID3. In such a configuration, the base station 402 selects the CID based on the ranked common subset of CIDs. For example, the base station 402 may select CID4, which is not in the list. For another example, if there were no other CIDs from which to choose, the base station 402 may select CID3, which is ranked last in the list and corresponds to a CID with the least determined energy among the available CIDs. As discussed supra, the received information may include a ranked list of non-interfering CIDs. The base station may then compare the ranked CIDs to determine a common subset of non-interfering ranked CIDs and select the CID from among the subset.

In one configuration, the first information is based on an SIR associated with each of the first plurality of CIDs and the second information is based on an SIR associated with each of the second plurality of CIDs. In such a configuration, the base station 402 may select the CID in both the first plurality of CIDs and the second plurality of CIDs associated with an SIR greater than a threshold. For example, the first plurality of CIDs may include the non-interfering CIDs CID4, CID3 and the second plurality of CIDs may include the non-interfering CIDs CID4, CID3. The base station 402 may select the CID from among the CIDs CID4, CID3 that is associated with an SIR greater than a threshold. If the reported SIR associated with the CID4 is greater than a threshold for both of the wireless devices 404A, 404B and the reported SIR associated with the CID3 is less than the threshold for one or both of the wireless devices 404A, 404B, the base station 402 would select CID4 for the wireless devices 404A, 404B.

In one configuration, the base station 402 selects the CID that would avoid causing a CID collision with another wireless device in the vicinity of the wireless device. In another configuration, the first information includes a number of active links in a vicinity of the first wireless device in addition to reported SIR information and the second information includes a number of active links in a vicinity of the second wireless device in addition to reported SIR information. In such a configuration, the base station 402 selects the CID associated with an SIR greater than a first threshold when the number of active links in the vicinity of the first wireless device and the number of active links in the vicinity of the second wireless device is less than a second threshold. In addition, the base station 402 selects the CID with an SIR greater than a third threshold less than the first threshold when the number of active links in the vicinity of the first wireless device and the number of active links in the vicinity of the second wireless device is greater than a fourth threshold. For example, if both the first wireless device and the second wireless device report a number of active links less than the second threshold (i.e., a relatively small number of active links), the base station 402 will select a CID associated with an SIR greater than a first threshold (i.e., a higher SIR). As such, when the CID resource is large, the base station 402 spreads out the CID distribution. For another example, if both the first wireless device and the second wireless device report a number of active links greater than the fourth threshold (i.e., a relatively large number of active links), the base station 402 will select a CID associated with an SIR greater than the third threshold that is less than the first threshold (i.e., a lower SIR closer to the threshold of being interfering). The third threshold is high enough such that other links using the CID would be considered non-interfering, but is lower than the first threshold. As such, when the CID resource is constrained, the base station 402 packs the CIDs tighter.

Figure 15:
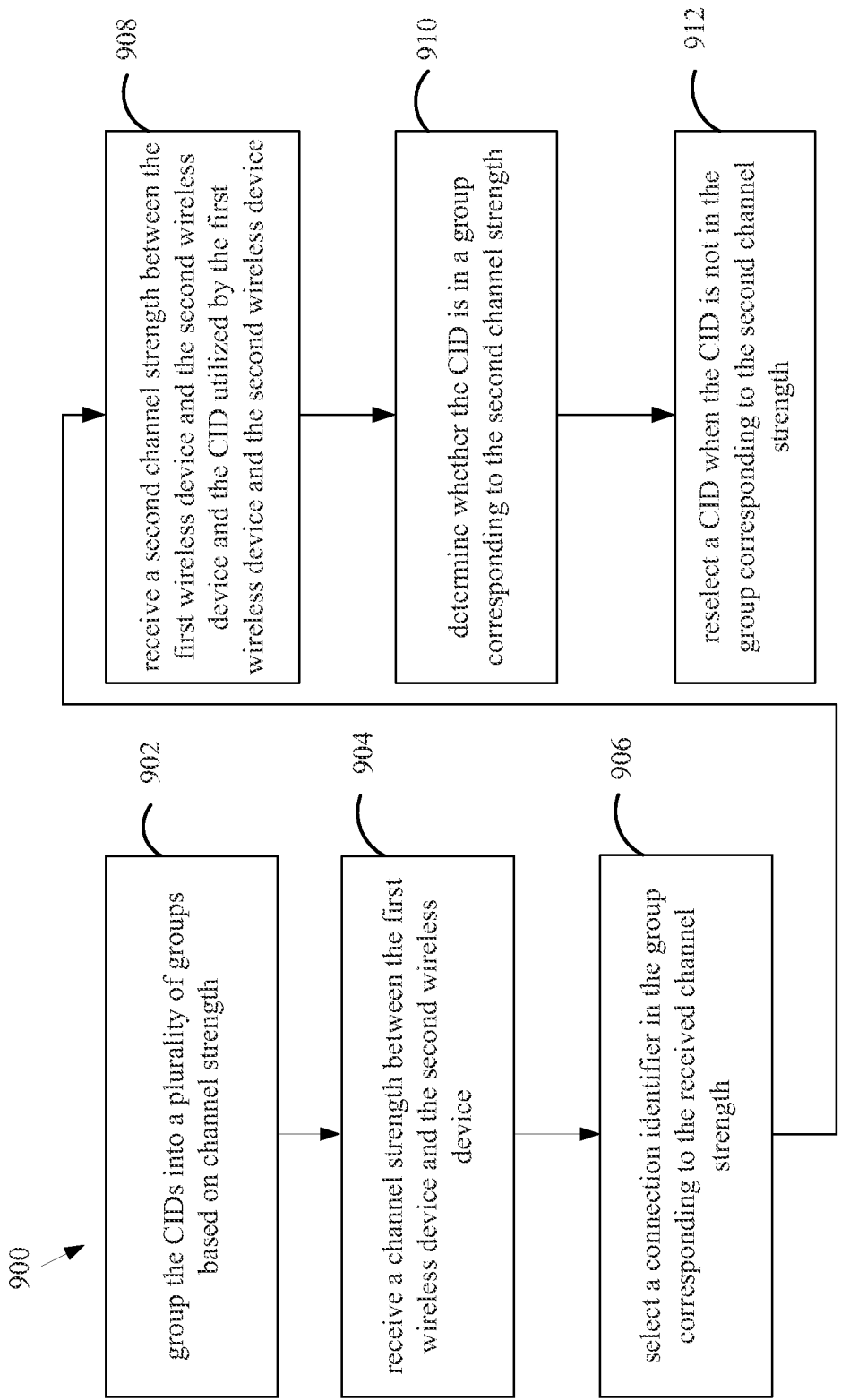
FIG. 15 is a flow chart of a second method of a base station.

FIG. 15 is a flow chart 900 of a second method of a base station, such as the base station 402. In one configuration, the base station 402 groups the CIDs into a plurality of groups based on channel strength (902). For example, the base station 402 may group the CIDs into a plurality of groups by associating each of the plurality of groups with a different channel strength range of values. The base station 402 receives from at least one of the first wireless device or the second wireless device a channel strength between the first wireless device and the second wireless device (904). Based on the received information, the base station 402 selects a CID that is in the group corresponding to the received channel strength (906). For example, assuming there are four CIDs, the base station 402 may group the CIDs CID1 and CID2 into a first group associated with channel strengths above a threshold (i.e., mid to high channel strengths, short links) and the CIDs CID3 and CID4 into a second group associated with channel strengths below the threshold (i.e., mid to low channel strengths, long links). If the base station 402 receives a channel strength from the wireless device 404A that is less than the threshold, the base station 402 assigns a CID to the wireless device 404A from the subset including the CIDs CID3 and CID4. If the base station 402 receives a channel strength from the wireless device 404A that is greater than the threshold, the base station 402 assigns a CID to the wireless device 404A from the subset including the CIDs CID1 and CID2.

After the wireless devices 404A, 404B utilize the assigned CID, the base station 402 may reselect their CID based on a channel strength between the wireless device 404A and the wireless device 404B. As shown in FIG. 15, the base station 402 receives a second channel strength between the first wireless device and the second wireless device and the CID utilized by the first wireless device and the second wireless device (908). The base station 402 determines whether the CID is in a group corresponding to the second channel strength (910). The base station reselects the CID when the CID is not in the group corresponding to the second channel strength (912). For example, if the wireless devices 404A, 404B are utilizing CID4 and report a channel strength that is greater than the threshold, the base station 402 will reselect the CID to a CID in the group corresponding to the high channel strengths. As such, the base station 402, will reselect the CID utilized by the wireless devices 404A, 404B by selecting CID1 or CID2 and informing the wireless devices 404A, 404B of the new selection.

Figure 16:
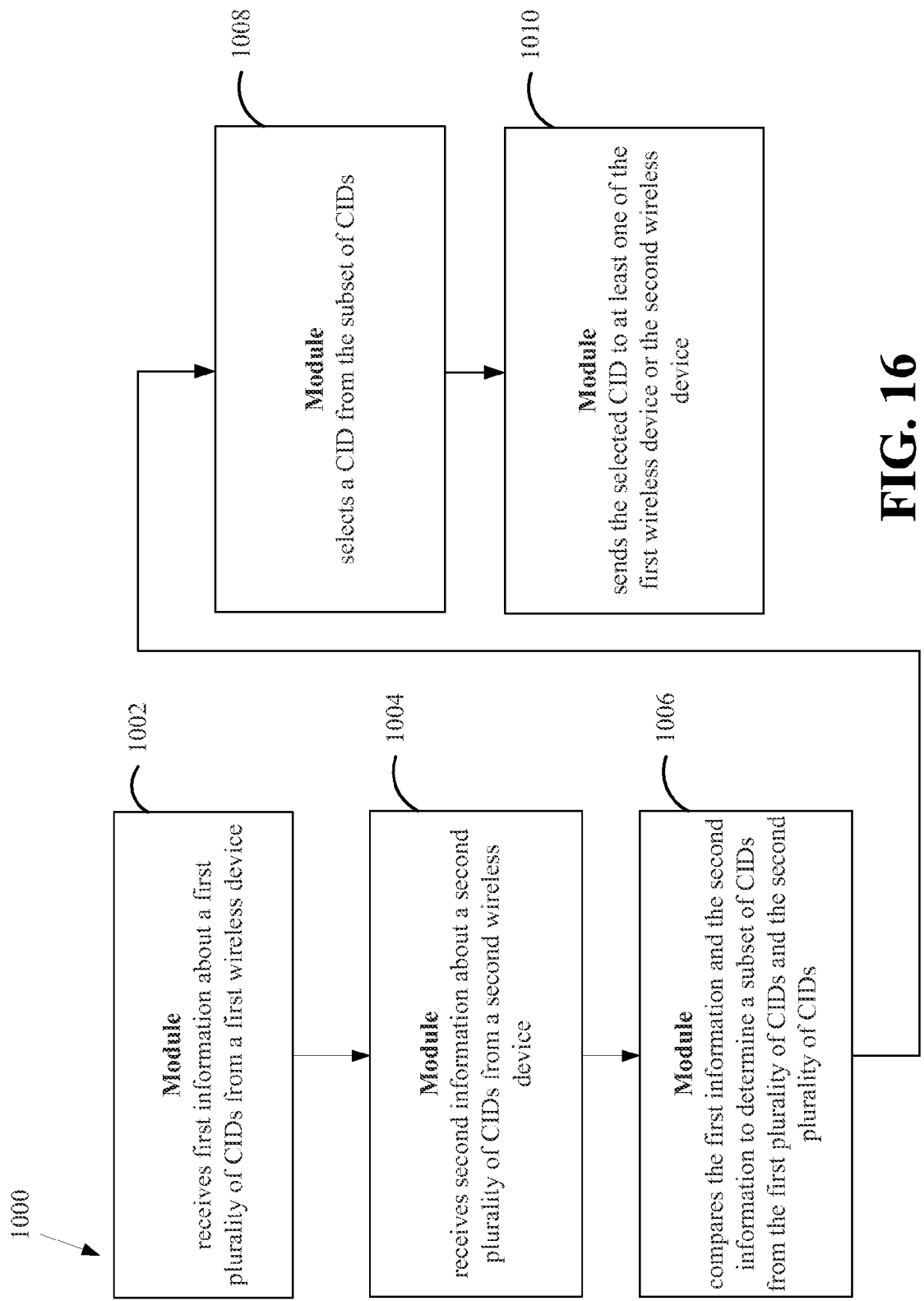
FIG. 16 is a conceptual block diagram illustrating the functionality of a second exemplary apparatus.

FIG. 16 is a conceptual block diagram 1000 illustrating the functionality of a second exemplary apparatus 100. The apparatus 100 may be a base station, such as the base station 402.

The apparatus 100 includes a module 1002 that receives first information about a first plurality of CIDs from a first wireless device. The apparatus 100 further includes a module 1004 that receives second information about a second plurality of CIDs from a second wireless device. The apparatus 100 further includes a module 1006 that compares the first information and the second information to determine a subset of CIDs based on the first plurality of CIDs and the second plurality of CIDs. The apparatus 100 further includes a module 1008 that selects a CID based on the subset of CIDs. The apparatus 100 further includes a module 1010 that sends the selected CID to at least one of the first wireless device or the second wireless device. The apparatus 100 may include additional modules that perform each of the steps in the aforementioned flow charts of FIG. 14 and FIG. 15. As such, each step in the aforementioned flow charts may be performed by a module and the apparatus 100 may include one or more of those modules.

Referring to FIG. 1, in one configuration, the apparatus 100 for wireless communication is a wireless device and includes means for determining an energy on each of a plurality of resources for broadcasting CIDs, means for sending information to a base station based on the determined energy for each of the CIDs, and means for receiving a CID from the base station, the CID being one of the CIDs determined based on the information. The apparatus 100 may further include means for ranking a subset of the CIDs based on the determined energy for each of the CIDs. In such a configuration, the information is further based on the ranked subset of CIDs. The apparatus 100 may further include means for determining an SIR associated with each of the CIDs. In such a configuration, the SIR is based on a transmit energy for an assigned CID and on the determined energy for each of the CIDs and the information is further based on the SIR associated with each of the CIDs. The apparatus 100 may further include means for determining a number of active links in a vicinity of the apparatus. In such a configuration, the information is further based on the determined number of active links. The apparatus 100 may further include means for determining a channel strength between the apparatus and a second apparatus with which the apparatus is in peer-to-peer communication. In such a configuration, the information is further based on the determined channel strength. The aforementioned means is the processing system 114 configured to perform the functions recited by the aforementioned means.

In another configuration, the apparatus 100 for wireless communication is a base station and includes means for receiving first information about a first plurality of CIDs from a first wireless device, means for receiving second information about a second plurality of CIDs from a second wireless device, means for comparing the first information and the second information to determine a subset of CIDs based on the first plurality of CIDs and the second plurality of CIDs, means for selecting a CID based on the subset of CIDs, and means for sending the selected CID to at least one of the first wireless device or the second wireless device. In one configuration, the means for selecting includes means for selecting the CID associated with an SIR greater than a first threshold when the number of active links in the vicinity of the first wireless device and the number of active links in the vicinity of the second wireless device is less than a second threshold, and means for selecting the CID with an SIR greater than a third threshold less than the first threshold when the number of active links in the vicinity of the first wireless device and the number of active links in the vicinity of the second wireless device is greater than a fourth threshold. The apparatus 100 may further include means for grouping the CIDs into a plurality of groups based on channel strength and means for receiving a channel strength between the first wireless device and the second wireless device. In such a configuration, the selected CID is in the group corresponding to the received channel strength. The apparatus 100 may further include means for receiving a second channel strength between the first wireless device and the second wireless device and the CID utilized by the first wireless device and the second wireless device, means for determining whether the CID is in a group corresponding to the second channel strength, and means for reselecting the CID when the CID is not in the group corresponding to the second channel strength. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a wireless device, comprising:
   determining an energy on each of a plurality of resources for broadcasting connection identifiers;
   determining a channel strength between the wireless device and a second wireless device with which the wireless device is in peer-to-peer communication;
   sending information to a base station based on the determined energy for each of the connection identifiers, the information being based on the determined channel strength; and
   receiving a connection identifier from the base station, the connection identifier being based on the determined channel strength and being one of the connection identifiers determined based on the information.

2. The method of claim 1, further comprising ranking a subset of the connection identifiers based on the determined energy for each of the connection identifiers, wherein the information is further based on the ranked subset of connection identifiers.

3. The method of claim 1, further comprising determining a signal to interference ratio (SIR) associated with each of the connection identifiers, wherein the SIR is based on a transmit energy for an assigned connection identifier and on the determined energy for each of the connection identifiers, wherein the information is further based on the SIR associated with each of the connection identifiers.

4. The method of claim 1, further comprising determining a number of active links in a vicinity of the wireless device, wherein the information is further based on the determined number of active links.

5. An apparatus for wireless communication, comprising:
   means for determining an energy on each of a plurality of resources for broadcasting connection identifiers;
   means for determining a channel strength between the apparatus and a second apparatus with which the apparatus is in peer-to-peer communication;
   means for sending information to a base station based on the determined energy for each of the connection identifiers, the information being based on the determined channel strength; and
   means for receiving a connection identifier from the base station, the connection identifier being based on the determined channel strength and being one of the connection identifiers determined based on the information.

6. The apparatus of claim 5, further comprising means for ranking a subset of the connection identifiers based on the determined energy for each of the connection identifiers, wherein the information is further based on the ranked subset of connection identifiers.

7. The apparatus of claim 5, further comprising means for determining a signal to interference ratio (SIR) associated with each of the connection identifiers, wherein the SIR is based on a transmit energy for an assigned connection identifier and on the determined energy for each of the connection identifiers, wherein the information is further based on the SIR associated with each of the connection identifiers.

8. The apparatus of claim 5, further comprising means for determining a number of active links in a vicinity of the apparatus, wherein the information is further based on the determined number of active links.

9. A computer program product in a wireless device, comprising:
   a non-transitory computer-readable medium comprising code for:
      determining an energy on each of a plurality of resources for broadcasting connection identifiers;
      determining a channel strength between the wireless device and a second wireless device with which the wireless device is in peer-to-peer communication;
      sending information to a base station based on the determined energy for each of the connection identifiers, the information being based on the determined channel strength; and
      receiving a connection identifier from the base station, the connection identifier being based on the determined channel strength and being one of the connection identifiers determined based on the information.

10. An apparatus for wireless communication, comprising:
    a processing system configured to:
       determine an energy on each of a plurality of resources for broadcasting connection identifiers;
       determine a channel strength between the apparatus and a second apparatus with which the apparatus is in peer-to-peer communication;

send information to a base station based on the determined energy for each of the connection identifiers, the information being based on the determined channel strength; and receive a connection identifier from the base station, the connection identifier being based on the determined channel strength and being one of the connection identifiers determined based on the information.

* * * * *